United States Patent
Zong et al.

(10) Patent No.: US 10,409,669 B2
(45) Date of Patent: Sep. 10, 2019

(54) DISCOVERING CRITICAL ALERTS THROUGH LEARNING OVER HETEROGENEOUS TEMPORAL GRAPHS

(71) Applicant: NEC Laboratories America, Inc., Princeton, NJ (US)

(72) Inventors: Bo Zong, Plainsboro, NJ (US); LuAn Tang, Pennington, NJ (US); Qi Song, Pullman, WA (US); Biplob Debnath, Princeton, NJ (US); Hui Zhang, Princeton, NJ (US); Guofei Jiang, Princeton, NJ (US)

(73) Assignee: NEC CORPORATION (JP)

( * ) Notice: Subject to any disclaimer, the term of this patent is extended or adjusted under 35 U.S.C. 154(b) by 165 days.

(21) Appl. No.: 15/810,960

(22) Filed: Nov. 13, 2017

(65) Prior Publication Data
US 2018/0137001 A1 May 17, 2018

Related U.S. Application Data

(60) Provisional application No. 62/422,909, filed on Nov. 16, 2016.

(51) Int. Cl.
| | |
|---|---|
| G06F 11/07 | (2006.01) |
| G06F 11/34 | (2006.01) |
| G06N 3/08 | (2006.01) |
| G06N 5/04 | (2006.01) |
| G06N 5/02 | (2006.01) |

(52) U.S. Cl.
CPC ........ *G06F 11/079* (2013.01); *G06F 11/0793* (2013.01); *G06F 11/3476* (2013.01); *G06N 3/084* (2013.01); *G06N 5/022* (2013.01); *G06N 5/04* (2013.01)

(58) Field of Classification Search
CPC .............. G06F 11/079; G06F 11/0793; G06F 11/1476; G06F 11/3476; G06N 3/084; G06N 5/022; G06N 5/04
USPC .............................................. 714/25, 26, 48
See application file for complete search history.

(56) References Cited

PUBLICATIONS

Rayana S., Akoglu L.; "Less is More: Building Selective Anomaly Ensembles with Application to Event Detection in Temporal Graphs," InProceedings of the 2015 SIAM International Conference on Data Mining; Jun. 30, 2015; pp. 622-630.*

(Continued)

*Primary Examiner* — Joseph R Kudirka
(74) *Attorney, Agent, or Firm* — Joseph Kolodka

(57) ABSTRACT

A method is provided that includes transforming training data into a neural network based learning model using a set of temporal graphs derived from the training data. The method includes performing model learning on the learning model by automatically adjusting learning model parameters based on the set of the temporal graphs to minimize differences between a predetermined ground-truth ranking list and a learning model output ranking list. The method includes transforming testing data into a neural network based inference model using another set of temporal graphs derived from the testing data. The method includes performing model inference by applying the inference and learning models to test data to extract context features for alerts in the test data and calculate a ranking list for the alerts based on the extracted context features. Top-ranked alerts are identified as critical alerts. Each alert represents an anomaly in the test data.

20 Claims, 8 Drawing Sheets

(56) References Cited

PUBLICATIONS

Cheng et al., "Ranking Causal Anomalies via Temporal and Dynamical Analysis on Vanishing Correlations", Proceedings of the ACM SIGKDD International Conference on Knowledge Discovery and Data Mining(SIGKDD), Aug. 2016, pp. 1-10.

Gao et al., "Consensus Extraction from Heterogeneous Detectors to Improve Performance over Network Traffic Anomaly Detection." IEEE International Conference on Computer Communications Mini-Conference: Apr. 5, 2011, pp. 181-185.

Gu et al., "Principled Reasoning and Practical Applications of Alert Fusion in Intrusion Detection Systems", Proceedings of ACM Symposium on InformAction, Computer and Communications Security, Mar. 2008, 12 pages.

Zong et al., "Towards Scalable Critical Alert Mining" Proceedings of the 20th ACM SIGKDD International Conference on Knowledge Discovery and Data Mining, Aug. 2014, 10 pages.

\* cited by examiner

DISCOVERING CRITICAL ALERTS THROUGH LEARNING OVER HETEROGENEOUS TEMPORAL GRAPHS

RELATED APPLICATION INFORMATION

This application claims priority to provisional application Ser. No. 62/422,909, filed on Nov. 16, 2016, incorporated herein by reference.

BACKGROUND

Technical Field

The present invention relates to information processing, and more particularly to discovering critical alerts through learning over heterogeneous temporal graphs.

Description of the Related Art

Log analysis systems offer services to automatically process logs from large complex systems and generate alerts when log anomalies are detected.

Since it is unfeasible for system admins to investigate an excessive number of alerts one by one, there is a need for an intelligent tool capable of recommending top-ranked alerts that will be more likely to trigger meaningful system diagnosis and improve system administrators' productivity.

SUMMARY

According to an aspect of the present invention, a computer-implemented method is provided. The method includes transforming, by a processor, training data into a neural network based learning model using a set of temporal graphs derived from the training data. The method further includes performing, by the processor, model learning on the learning model by automatically adjusting learning model parameters based on the set of the temporal graphs to minimize differences between a predetermined ground-truth ranking list and a learning model output ranking list. The method also includes transforming, by the processor, testing data into a neural network based inference model using another set of temporal graphs derived from the testing data. The method additionally includes performing, by the processor, model inference by applying the inference model and the learning model to test data to extract context features for alerts in the test data and calculate a ranking list for the alerts in the test data based on the extracted context features. Top-ranked ones of the alerts in the ranking list are identified as critical alerts. Each of the alerts represents an anomaly in the test data.

According to another aspect of the present invention, a computer program product is provided. The computer program product includes a non-transitory computer readable storage medium having program instructions embodied therewith. The program instructions are executable by a computer to cause the computer to perform a method. The method includes transforming, by a processor of the computer, training data into a neural network based learning model using a set of temporal graphs derived from the training data. The method further includes performing, by the processor, model learning on the learning model by automatically adjusting learning model parameters based on the set of the temporal graphs to minimize differences between a predetermined ground-truth ranking list and a learning model output ranking list. The method also includes transforming, by the processor, testing data into a neural network based inference model using another set of temporal graphs derived from the testing data. The method additionally includes performing, by the processor, model inference by applying the inference model and the learning model to test data to extract context features for alerts in the test data and calculate a ranking list for the alerts in the test data based on the extracted context features. Top-ranked ones of the alerts in the ranking list are identified as critical alerts. Each of the alerts represents an anomaly in the test data.

According to yet another aspect of the present invention, a computer processing system is provided. The computer processing system includes a processor. The processor is configured to transform training data into a neural network based learning model using a set of temporal graphs derived from the training data. The processor is further configured to perform model learning on the learning model by automatically adjusting learning model parameters based on the set of the temporal graphs to minimize differences between a predetermined ground-truth ranking list and a learning model output ranking list. The processor is also configured to transform testing data into a neural network based inference model using another set of temporal graphs derived from the testing data. The processor is further configured to perform model inference by applying the inference model and the learning model to test data to extract context features for alerts in the test data and calculate a ranking list for the alerts in the test data based on the extracted context features. Top-ranked ones of the alerts in the ranking list are identified as critical alerts. Each of the alerts represents an anomaly in the test data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to discovering critical alerts through learning over heterogeneous temporal graphs In an embodiment, the present invention provides a solution to the alert ranking problem which can involve the following: given a collection of logs, alerts generated from a subset of abnormal logs, and users' feedback on such alerts indicating whether they are meaningful for further investigation, learn a rank function for alerts so that for new alerts, higher ranked ones are more likely to be true anomalies that trigger meaningful investigation and/or curative actions.

In an embodiment, a general-purpose method is proposed (and interchangeably referred to as "TGNet") that learns a rank function from users' feedback on alerts. Unlike conventional methods that assume the quality of alerts is identically and independently distributed, TGNet assumes context features define each individual alert so that the quality of each alert is conditioned on its context features. TGNet includes the following two major steps: model learning; and model inference.

In model learning, given training data that include users' preference on alerts, TGNet automatically adjusts model parameters and minimizes ranking discrepancy between model output and user feedback.

In model inference, given model parameters, TGNet automatically extracts context features for alerts by performing structural and temporal graph propagation over temporal graphs, and assign proper ranking score by the context features.

Figure 1:
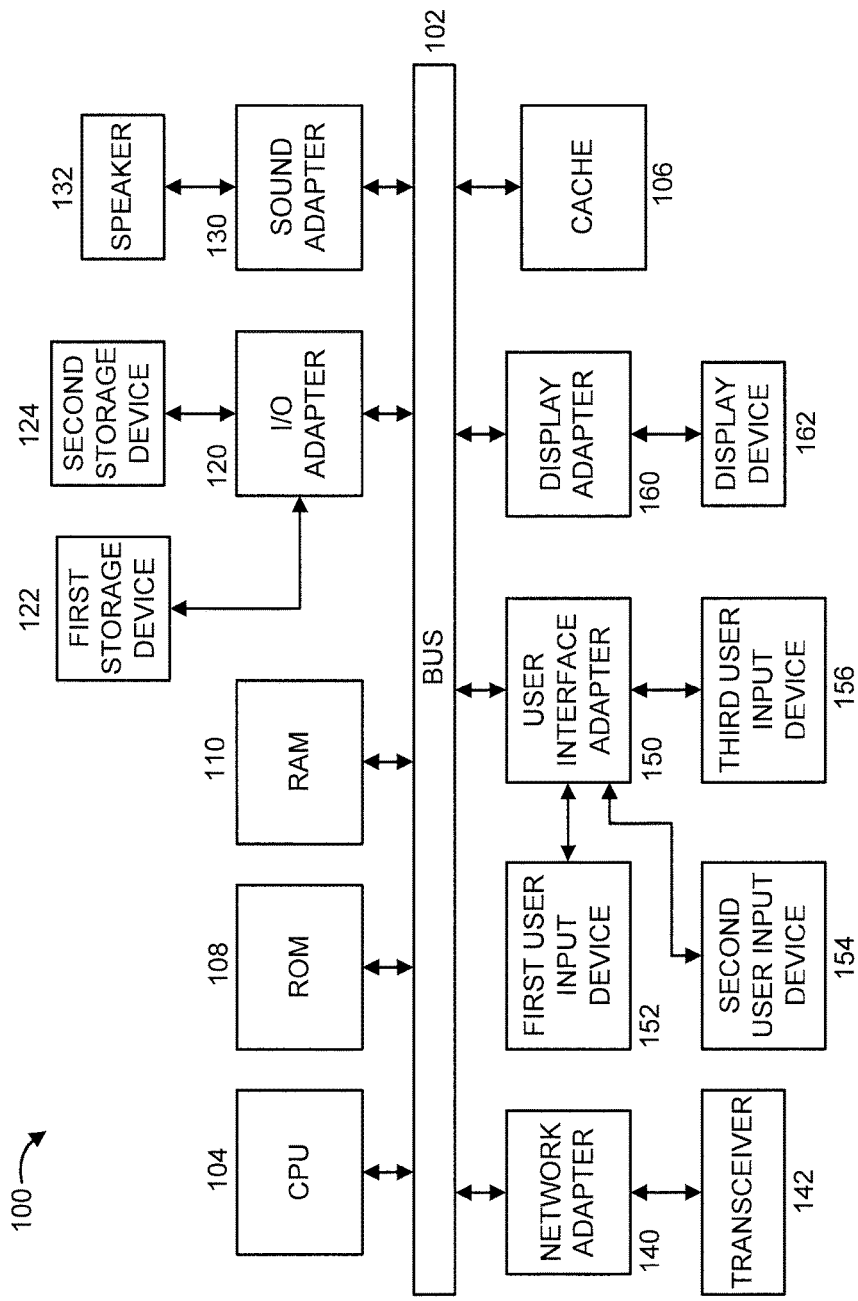
FIG. 1 is a block diagram illustrating an exemplary processing system to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
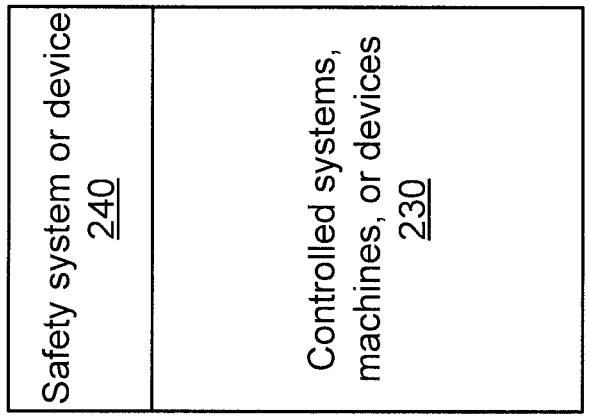
FIG. 2 shows a block diagram of an exemplary environment 200 to which the present invention can be applied, in accordance with an embodiment of the present invention.
Figure 2:
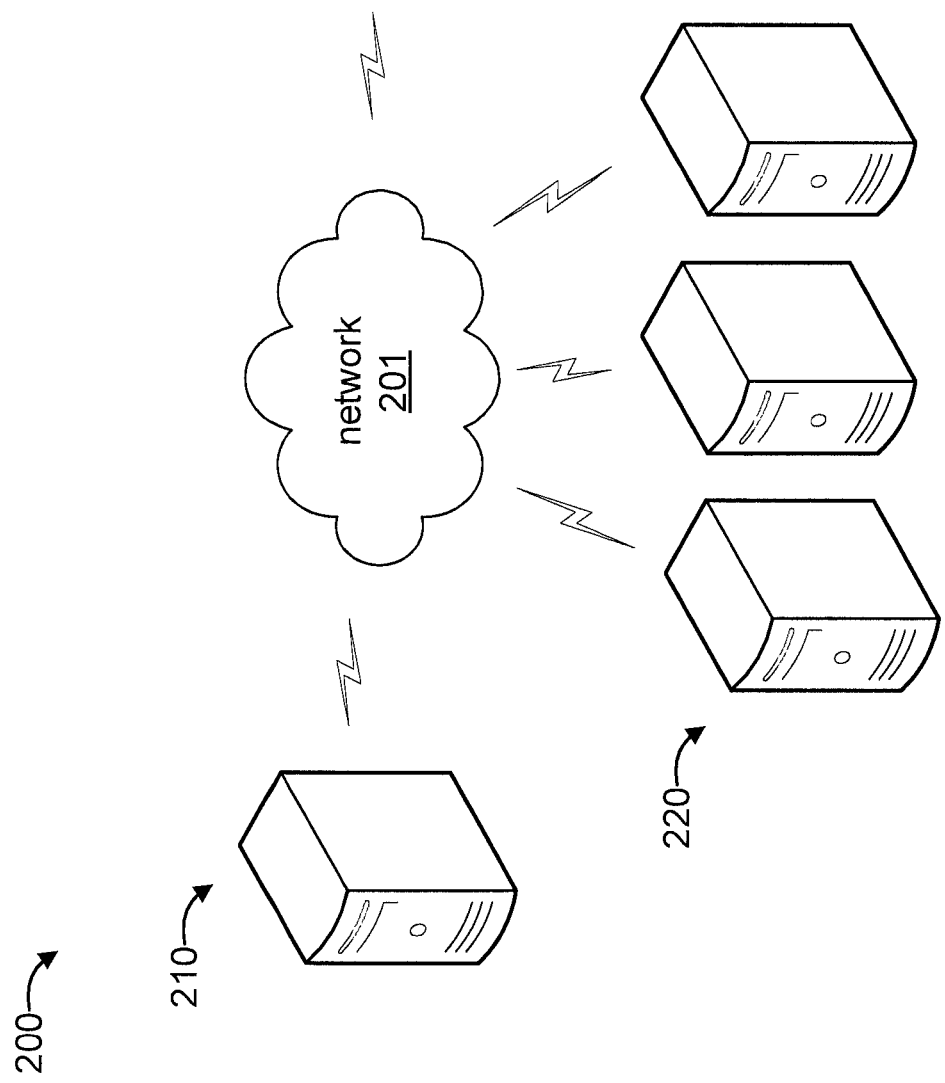

Moreover, it is to be appreciated that system 200 described below with respect to FIG. 2 is a system for implementing respective embodiments of the present principles. Part or all of processing system 100 may be implemented in one or more of the elements of system 200.

Figure 3:
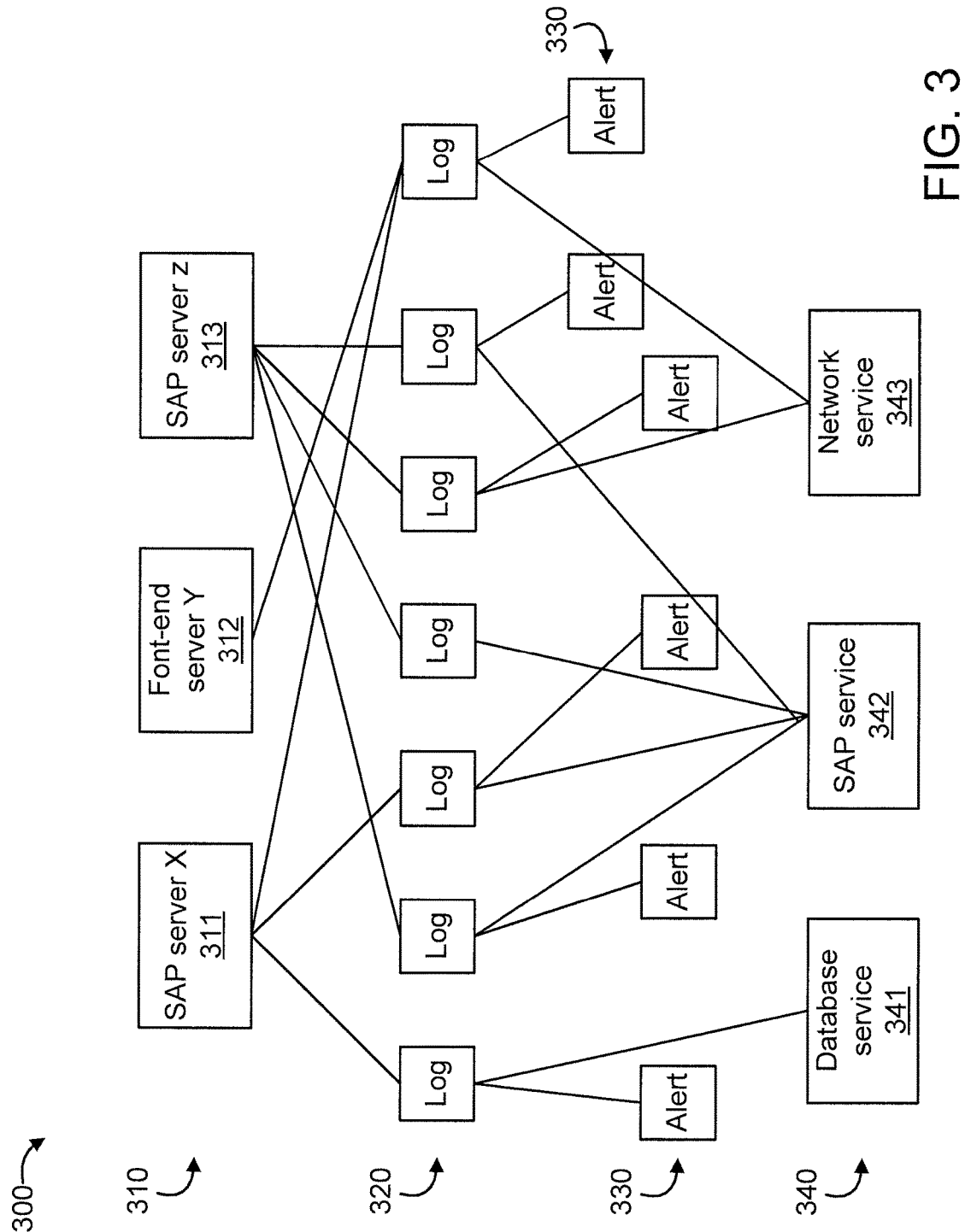
FIG. 3 shows system log data presented as a temporal graph to which the present invention can be applied, in accordance with an embodiment of the present invention.
Figure 4:
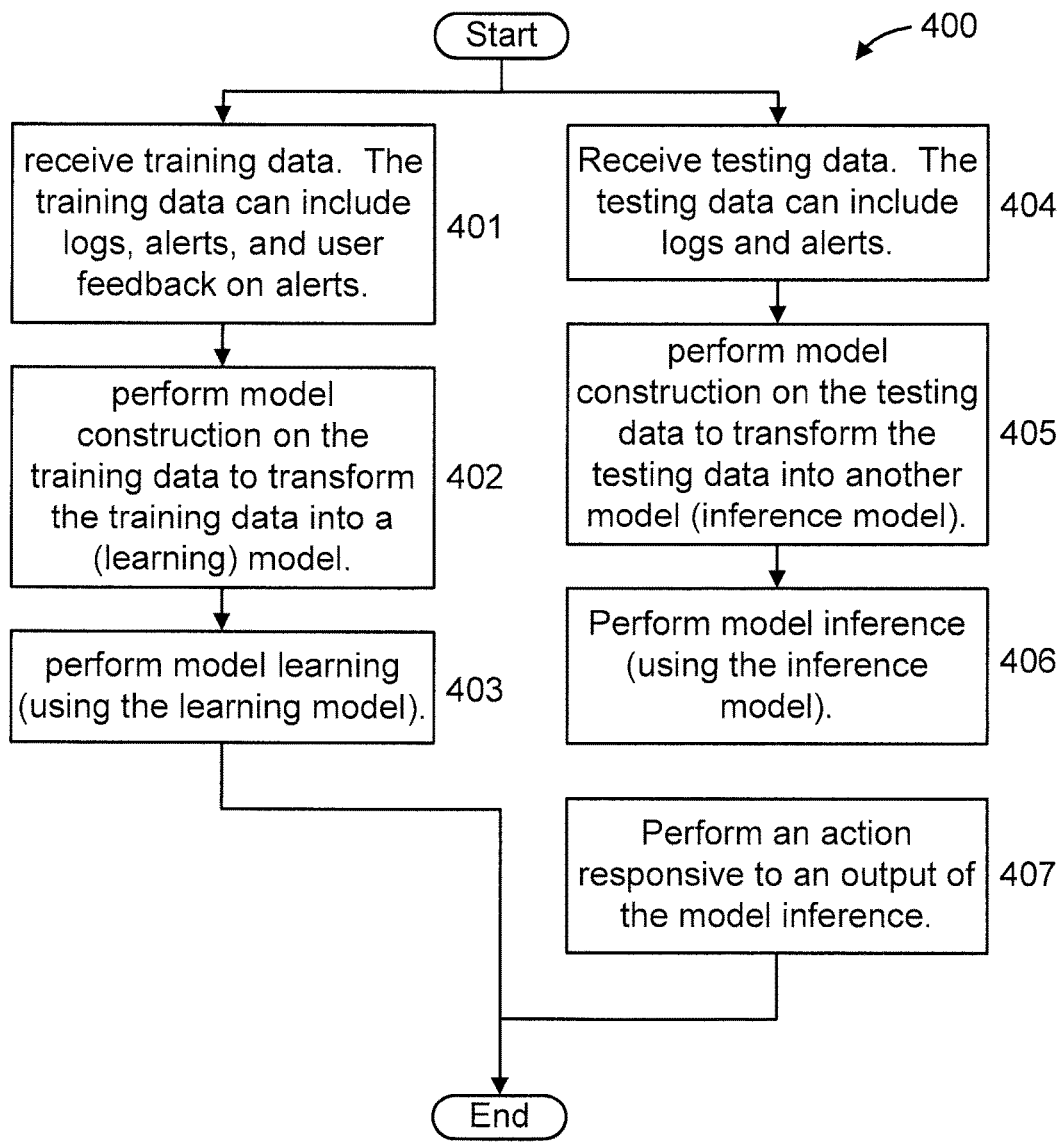
FIG. 4 shows an exemplary method for alert ranking, in accordance with an embodiment of the present invention.

Further, it is to be appreciated that processing system 100 may perform at least part of the method described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

FIG. 2 shows a block diagram of an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations and other operational environments as readily contemplated by one of ordinary skill in the art given the teachings of the present invention provided herein, while maintaining the spirit of the present invention.

The environment 200 at least includes a critical alert recommendation system 210 operatively coupled to a set of computing nodes (e.g., servers, providers of services, etc.) 220.

The critical alert recommendation system 210 is trained using training data. The training data can include, for example, logs, alerts, and user feedback on alerts. The source(s) of the training data can be and/or otherwise involve an alert database and/or a user feedback (on alerts) database. The training data can be obtained from the set of computing nodes 220 or another source(s). In either case, databases such as the aforementioned alert and user feedback databases can be included in these sources such as, but not limited to, the set of computing nodes 220. The training data is used to form a model used for model learning (hereinafter interchangeably referred to as the "learning mode"). To that end, learning model parameters can be automatically adjusted to minimize differences between a ground-truth ranking list and a model output ranking list. Preferably, the training data is obtained from the same or similar source as the testing data.

The critical alert recommendation system 210 receives testing data from the set of computing nodes 220. The testing data is used to form a model used for model inference (hereinafter interchangeably referred to as the "inference model"). The inference model is used to identify critical alerts in the test data using ranking. In this way, higher ranked alerts, which are more likely to be true anomalies, can be further investigated and/or acted upon (using curative actions).

The learning model and the inference model can be considered to form a temporal graph filter. The inputs to the temporal graph filter can be considered to be the inputs to the models, while the output of the temporal graph filer can be considered to be the output of the inference model.

The critical alert recommendation system 210 can be any type of computer processing system including, but not limited to, servers, desktops, laptops, tablets, smart phones, media playback devices, and so forth, depending upon the particular implementation. For the sake of illustration, the computer processing system 210 is a server.

The critical alert recommendation system 210 can be configured to perform an action (e.g., a control action) on a controlled system, machine, and/or device 230 responsive to detecting an anomaly. Such action can include, but is not limited to, one or more of: applying an antivirus detection and eradication program; powering down the controlled system, machine, and/or device 230 or a portion thereof; powering down, e.g., a system, machine, and/or a device that is affected by an anomaly in another device, opening a valve to relieve excessive pressure (depending upon the anomaly), locking an automatic fire door, and so forth. As is evident to one of ordinary skill in the art, the action taken is dependent upon the type of anomaly and the controlled system, machine, and/or device 230 to which the action is applied.

In an embodiment, a safety system or device 240 can implement the aforementioned or other action, responsive to a control signal from the critical alert recommendation system 210. The safety system or device 240 can be used to control a shut off switch, a fire suppression system, an overpressure valve, and so forth. As is readily appreciated by one of ordinary skill in the art, the particular safety system or device 240 used depends upon the particular implementation to which the present invention is applied. Hence, the safety system 240 can be located within or proximate to or remote from the controlled system, machine, and/or device 230, depending upon the particular implementation.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 shows system log data presented as a temporal graph 300 to which the present invention can be applied, in accordance with an embodiment of the present invention. The system log data can correspond to logs from, for example, a data center or other data processing entity.

Nodes of the temporal graph 300 represent a heterogeneous set of system entities, edges represent dependencies between the system entities, and time stamps on edges indicate when interactions occurred.

The system entities include servers 310, logs 320, alerts 330, and software components 340. In the embodiment of FIG. 3, the servers include a SAP server 311, a front-end server 312, and a SAP server 313. In the embodiment of FIG. 3, the software components 340 include a database (DB) service 341, a SAP service 342, and a network service 343. Of course, other servers and/or other software components can be used, depending upon the implementation, while maintaining the spirit of the present invention.

FIG. 4 shows an exemplary method 400 for alert ranking, in accordance with an embodiment of the present invention.

At step 401, receive training data. The training data can include logs, alerts, and user feedback on alerts.

At step 402, perform model construction on the training data to transform the training data into a model. The model resulting from step 402 is used for model learning per step 403, and is thus interchangeably referred to herein as the "learning model".

At step 403, perform model learning (using the learning model).

At step 404, receive testing data. The testing data can include logs and alerts.

At step 405, perform model construction on the testing data to transform the testing data into another model. The other model resulting from step 405 is used for model inference per step 406, and is thus interchangeably referred to herein as the "inference model".

At step 406, perform model inference (using the inference model).

At step 407, perform an action responsive to an output of the model inference.

A further description will now be given regarding some of the steps of method 400.

Further regarding step 401, the present invention takes output data from log analytics systems as its input data for model learning. Such data include logs, alerts, and user feedback on alerts. Regarding the logs, each log indicates an event happened at a specific time about a specific software in a specific machine. Regarding the alerts, each alert indicates a log or a set of logs is abnormal. Regarding the user feedback, the same indicates importance of alerts judged by users' domain knowledge. Such alert importance naturally forms a ranking list over alerts.

Further regarding step 404, for any new data, the present invention performs model inference and give a recommended ranking list over alerts in the data. The new data is referred to as testing data, which can include logs and alerts. Regarding the logs, each log indicates an event happened at a specific time about a specific software in a specific machine. Regarding the alerts, each alert indicates a log or a set of logs is abnormal.

Figure 5:
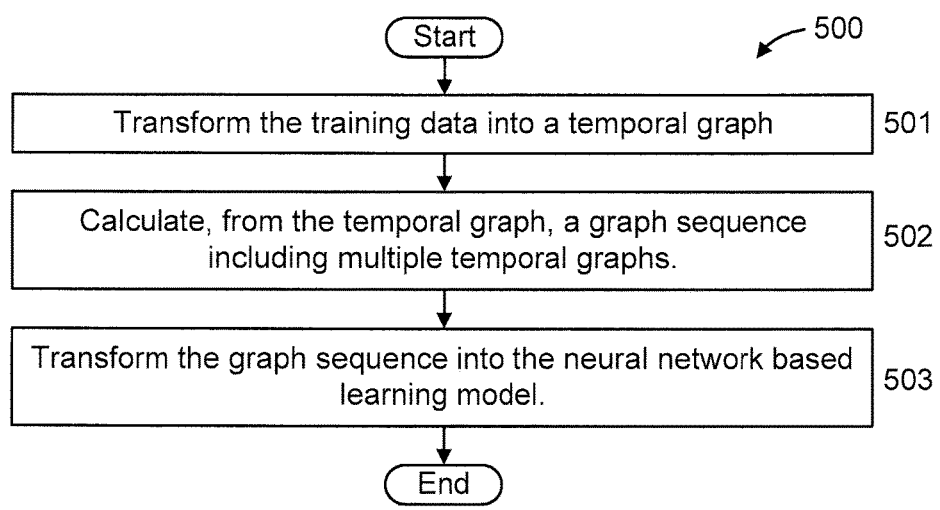
FIG. 5 shows an exemplary method further showing the model construction of step of FIG. 4, in accordance with an embodiment of the present invention.

FIG. 5 shows an exemplary method 500 further showing the model construction of step 402 of FIG. 4, in accordance with an embodiment of the present invention.

At step 501, transform the training data into a temporal graph.

At step 502, calculate, from the temporal graph, a graph sequence including multiple temporal graphs.

At step 503, transform the graph sequence into the neural network based learning model.

A further description will now be given regarding the steps of method 500, in accordance with one or more embodiments of the present invention.

Further regarding step 501, as mentioned above, training data include logs, alerts, and user feedback. Based on log and alert information, four types of graph nodes can be derived as follows: (1) log node; (2) alert node; (3) server node; and (4) software node. In the following, we show how different types of nodes connect to each other.

Step 501 can be considered to include and/or otherwise involving the following 501A-E.

At step 501A, let each log node represent an individual log in training data. Let a log node connects to the software node that generates this log, and all the alert nodes that are related to this log.

At step 501B, let each alert node represent an alert in training data. Let an alert node connects to a log or a sets of logs that is related this alert.

At step 501C, let each server node represents a server that appears in training data. Let a server node connect to a set of software nodes that are contained from this server.

At step 501D, let each software node represents a software that appears in training data. Let a software node connect to a set of logs that are generated from this software, and the server node that contains this software.

At step 501E, let each edge mentioned above be associated with a pair of timestamps as follows: one denotes the starting timestamp of the dependency encoded by this edge; and the other denotes the ending timestamps of the dependency encoded by this edge.

After these steps (501A-E), we obtain a temporal graph $G_T$ derived from training data.

Further regarding step 502, a graph sequence Gs=$G^{(1)}$, $G^{(2)}$, ..., $G^{(k-1)}$, $G^{(k)}$> is derived for the temporal graph G generated at step 501. We start with an initial graph $G^{(1)}$ that includes nodes and edges with smallest starting timestamps. Then we perform the following steps 502A-C to generate a sequence of graphs. Without loss of generality, $G^{(i)}$ is the graph under processing, and $G^{(i)}$ starts at time $t^{(i)}_{start}$.

At step 502A, let $t^{(i)}_{end}$ be the earliest timestamp after $t^{(i)}_{start}$ when there are edges run out of their lifetime or there are new edges that join. The time interval ($t^{(i)}_{start}$, $t^{(i)}_{end}$) indicates the lifetime during which G(i) holds.

At step 502B, generate $G^{(i+1)}$ by removing expired edges from $G^{(i)}$ and adding new edges to $G^{(i)}$, and we set $t^{(i+1)}_{start}$ as $t^{(i)}_{end}$.

At step 502C, repeat steps 502A and 502B until the resulting graph sequence covers all the information in G.

After these steps (502A-C), a graph sequence Gs=$G^{(1)}$, $G^{(2)}$, ..., $G^{(k-1)}$, $G^{(k)}$> is derived from the training data.

Further regarding step 503, Gs is transformed into TGNet as per steps 503A-G as follows. Without loss of generality, $G^{(i)}$ is the graph under processing.

At step 503A, identify the node set $N^{(i)}$ from $G^{(i)}$ that includes the nodes which appear in Gs for the first time. For each node v in $N^{(i)}$, it is associated with a $d_i \times 1$ input vector $x_v$. Note that exact values of $x_v$ are decided in a concrete application.

At step 503B, for any node v in $G^{(i)}$, it is associated with a $d_i \times 1$ hidden vector h(i)v.

At step 503C, set up a $d_h \times d_i$ parameter matrix $W_{in}$, which controls the process of transforming input vectors into hidden vectors.

At step 503D, set up a $2d_h \times 1$ parameter vector $\theta_c$, which controls the amount of influence between two nodes.

At step 503E, set up a $(d_h+1) \times d_h$ parameter matrix $W_{temp}$, which controls the amount of temporal changes on each node's hidden vector.

At step 503F, set up a $d_h \times 1$ parameter vector $\theta_{out}$, which controls the process of transforming hidden vectors into output ranking score.

At step 503G, we repeat steps 503A-F until all graphs in Gs are processed.

After these steps (503A-G), a TGNet instance is obtained that is ready for parameter learning.

Figure 6:
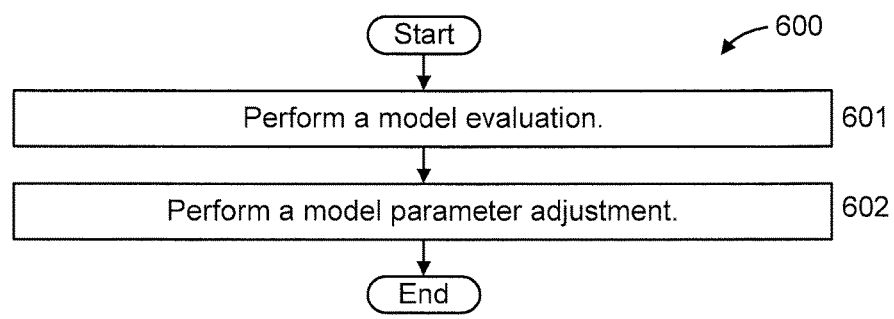
FIG. 6 shows an exemplary method further showing the model learning of step of FIG. 4, in accordance with an embodiment of the present invention.

FIG. 6 shows an exemplary method 600 further showing the model learning of step 403 of FIG. 4, in accordance with an embodiment of the present invention.

At the beginning, we randomly initialize model parameters including $W_{in}$, $\theta_c$, $\theta_{out}$, and $W_{temp}$. Then we repeat steps 601 and 602 described below until the discrepancy converges.

At step 601, perform a model evaluation.

At step 602, perform a model parameter adjustment.

A further description will now be given regarding the steps of method 500, in accordance with one or more embodiments of the present invention.

Further regarding step 601, given model parameters, the goal is to evaluate a model-output ranking list. We go through graphs in Gs one by one, and repeat the following process, as delineated by steps 601A-D. Without loss of generality, $G^{(i)}$ is the graph under processing.

At step 601A, let $N^{(i)}$ be the node set in $G^{(i)}$ that includes all the nodes that appear in Gs for the first time. For any node v in $N^{(i)}$, we compute its hidden vector by the following equation $$h^{(i)}_v = f(W_{in} x_v)$$

where f( ) is sigmoid function.

At step 601B, perform concurrent propagation (as follows). For any node v in $G^{(i)}$, initialize $h^{(i,\ 0)}_v$ by $h^{(i)}_v$, and perform concurrent propagation by the following propagation:

$$h^{(i,j+1)}_v = \sum_{u \in N(v) \cup \{v\}} \sigma(z^{(i,j)}_v)_u h^{(i,j)}_u$$

where $\sigma(z^{(i,j)}_v)_u$ is the amount of influence from u to v. In particular, $\sigma(z^{(i,j)}_v)_u$ computed as follows:

$$\sigma(z^{(i,j)}_v)u = \frac{e^{z^{(i,j)}_{v,u}}}{\sum_{w \in N(v) \cup \{v\}} e^{z^{(i,j)}_{v,w}}}$$

where $z^{(i,j)}_{v,u}$ is computed by the following equation:

$$z^{(i,j)}_{v,u} = f(\theta_c^T [h^{(i,j)}_v, h^{(i,j)}_u])$$

Note that concurrent propagation is performed $D^{(i)}$ times on graph $G^{(i)}$, where $D^{(i)}$ is the diameter of G(i).

At step 601C, generate a ranking score (as follows). If node v is an alert node, its ranking score is computed by the following:

$$\hat{r}_v = f(\theta_{out}^T h^{(i, D^{(i)})}_v)$$

At step 601D, perform temporal propagation (as follows). For any node v in $G^{(i)}$, if it still exists in $G^{(i+1)}$. $h^{(i+1)}_v$ is initialized as follows:

$$h^{(i+1)}_v = \lambda_v^{(i)} \cdot h^{(i, D^{(i)})}_v),$$

where operator o is element-wise product, and $\lambda v^{(i)}$ is computed by $$\lambda_v^{(i)} = f(W_{temp} [h^{(i, D^{(i)})}_v, t_{end}^{(i)} - t_{start}^{(i)}])$$

The model evaluation per step 601 repeats steps 601A-D from $G^{(1)}$ to $G^{(k)}$ covering all graphs in Gs.

Further regarding step 602, we first utilize the output from model evaluation (601) to compute the error, and then perform parameter adjustment by backpropagation through time. In an embodiment, step 602 can include steps 602A-B.

At step 602A, perform error computation (as follows). In an embodiment, the model error is computed by the following equation:

$$J = \Sigma v{:}\text{alert} \Sigma_{u{:}alert} \delta(v,u)(\hat{r}_v - \hat{r}_u)$$

where $\delta(v, u)$ is $-1$, if v's rank is higher than u's rank in user feedback; otherwise, it is 1.

At step 602B, perform error minimization (as follows). In order to minimize J, stochastic gradient descent over J and backpropagation through time are performed to adjust parameters including $W_{in}$, $\theta_c$, $\theta_{out}$, and $W_{temp}$.

Note that adjusted parameters after step 602 will be the input parameters for the next round of step 601. We repeat a loop over steps 601 and 602 until the improvement between two rounds is small enough (e.g., below a threshold amount).

Figure 7:
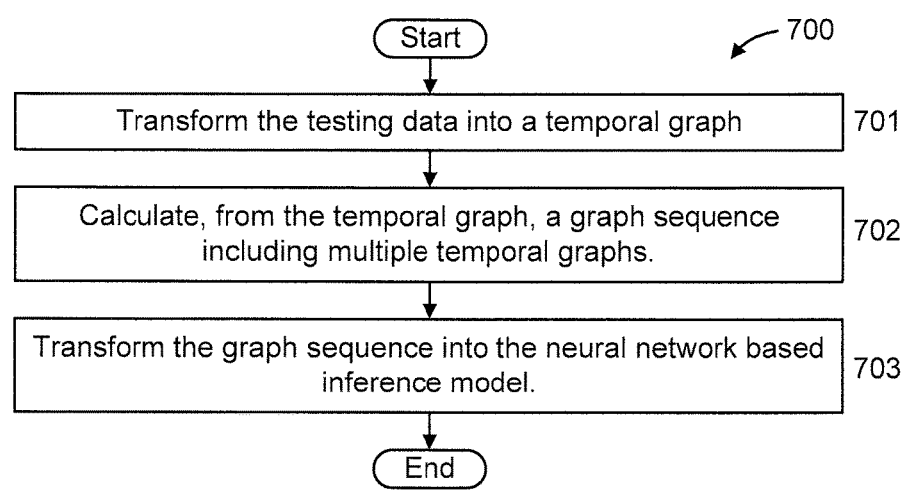
FIG. 7 shows an exemplary method further showing the model construction of step of FIG. 4, in accordance with an embodiment of the present invention.

FIG. 7 shows an exemplary method 700 further showing the model construction of step 405 of FIG. 4, in accordance with an embodiment of the present invention.

At step 701, transform the testing data into a temporal graph.

At step 702, calculate, from the temporal graph, a graph sequence including multiple temporal graphs.

At step 703, transform the graph sequence into the neural network based inference model.

A further description will now be given regarding the steps of method 700, in accordance with one or more embodiments of the present invention.

It is to be appreciated that steps 701 and 702 are performed similar to steps 501 and 502 of method 500 of FIG. 5. Regarding step 703, we set up input and hidden vectors for nodes in graph sequence, and model parameters are the learned ones from step 403 of method 400 of FIG. 4.

Figure 8:
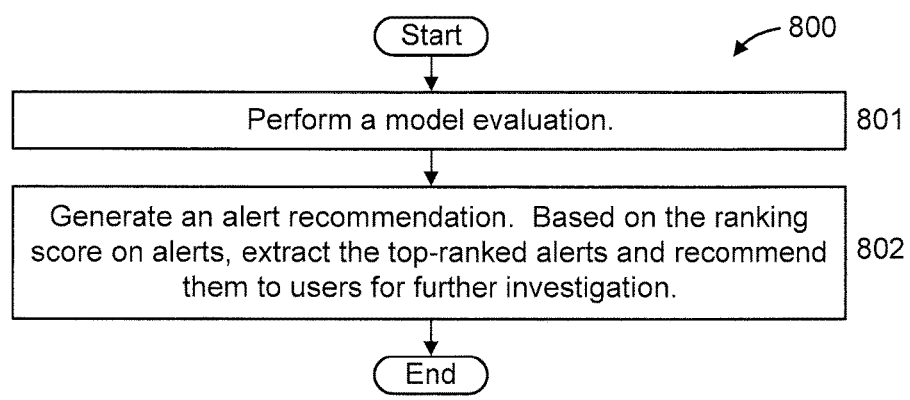
FIG. 8 shows an exemplary method further showing the model inference of step of FIG. 4, in accordance with an embodiment of the present invention.

FIG. 8 shows an exemplary method 800 further showing the model inference of step 406 of FIG. 4, in accordance with an embodiment of the present invention.

At step 801, perform a model evaluation (as follows). Using the learned parameters from model learning, a model evaluation is performed using the same approach described for step algorithm discussed in step 601 of method 600 of FIG. 6.

At step 802, generate an alert recommendation (as follows). Based on the ranking score on alerts, extract the top-ranked alerts and recommend them to users for further investigation.

A description will now be given regarding alert relationships to which the present invention can be applied, in accordance with one or more embodiments of the present invention.

For example, such alert relationships can include, but are not limited to the following:

Alerts are not isolated
Temporal closeness:
  Alert A is one second behind alert B;
  Alert C is one minute behind alert B.
  (A,B) is closer than (B,C).
Physical closeness:
  A and B are generated from the same server.
  B and C are generated from different servers.
  (A, B) is closer.
Semantic closeness:
  A and B are generated from logs sharing the same template.
  B and C are generated from logs sharing different templates.
  (A, B) is closer.

A description will now be given of some of the many attendant advantages of the present invention.

The present invention provides a method that leverages user knowledge to improve accuracy and usability of alert ranking in general log analysis systems.

In TGNet model learning, user feedback on alerts is utilized to train model parameters without heavy dependency on sophisticated domain knowledge, which significantly improves the usability of alert ranking.

In TGNet model inference, context features are automatically formed without human interference. Such context features further generate meaningful ranking scores that suggest the priority of alert investigation and improve system admins' productivity The present invention provides a method that uses temporal graphs and graph sequence to represent temporal and structural relationships in log data, including 402 and 403, which enables context features extraction. Unlike conventional methods that assume alerts are independently and identically distributed and anomaly detectors have uniform quality, the present invention presumes that each alert is defined by its context features.

A deep learning method is provided that automatically extracts context features for alerts so that the discrepancy between model-output ranking list and ground truth ranking list is minimized, including 403 and 406 of method 400 of FIG. 5. Unlike traditional learning-to-rank methods on graphs that use fixed pair-wise node influence which is either learned or preset by heuristic methods, the present invention dynamically decides node and temporal influence by their updated hidden vectors, which significantly enhances the expressive power of the model.

The present invention provides data fusion over alerts by identifying relationships between heterogeneous alerts; integrating alert relationships into temporal graphs; forming contexts by substructures in the temporal graphs; and ranking alerts by features provided in the contexts (high rank→critical). The alerts can be generated using multiple different detectors.

These and other advantages of the present invention are readily determined by one of ordinary skill in the art, given the teachings of the present invention provided herein.

As readily appreciated by one of ordinary skill in the art, given the teachings of the present invention provided herein, that the present invention can be applied to various applications. For example, some exemplary applications to various embodiments of the present invention can be applied include, but are not limited to, the following: big data analytics in system management; system malfunction detection via alerts; the high false positive problem; critical alert discovery; learning contexts and ranking alerts; and so forth.

Regarding learning contexts and ranking alerts, the context can be used to determine under what conditions the (anomaly) detectors perform well or bad. Moreover, in an embodiment, user feedback is used to guide both context formulation and ranking. To that end, in an embodiment, a parametric model is used to simulate context formulation and ranking process. The user feedback can involve user labels or feedback including, but is not limited to, "critical", "suspicious", or "ignore". Model parameters are then learned that best meet (match) the user feedback.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:
transforming, by a processor, training data into a neural network based learning model using a set of temporal graphs derived from the training data;
performing, by the processor, model learning on the learning model by automatically adjusting learning model parameters based on the set of the temporal graphs to minimize differences between a predetermined ground-truth ranking list and a learning model output ranking list;
transforming, by the processor, testing data into a neural network based inference model using another set of temporal graphs derived from the testing data; and
performing, by the processor, model inference by applying the inference model and the learning model to test data to extract context features for alerts in the test data and calculate a ranking list for the alerts in the test data based on the extracted context features, wherein top-ranked ones of the alerts in the ranking list are identified as critical alerts, each of the alerts representing an anomaly in the test data.

2. The computer-implemented method of claim 1, wherein performing the model learning comprises performing structural and temporal graph propagation over the set of temporal graphs.

3. The computer-implemented method of claim 1, wherein the training data comprises logs, alerts, and user feedback on alerts.

4. The computer-implemented method of claim 1, wherein transforming the training data comprises:
transforming the training data into a single temporal graph;
calculating, from the single temporal graph, the set of temporal graphs that form a graph sequence; and
transforming the graph sequence into the learning model.

5. The computer-implemented method of claim 1, wherein the learning model parameters are automatically adjusted using a back propagation through time technique.

6. The computer-implemented method of claim 1, wherein the ground-truth ranking list is derived from user feedback on alerts.

7. The computer-implemented method of claim 1, wherein the set of temporal graphs comprises four types of graph nodes, the four types of graph nodes being a log node type, an alert node type, a server node type, and a software node type.

8. The computer-implemented method of claim 7, wherein the set of temporal graphs further =comprises edges representing dependencies between the graph nodes and timestamps on the edges representing a time of interaction therebetween.

9. The computer-implemented method of claim 1, wherein states of nodes in the set of temporal graphs are dynamically determined based on updated hidden vectors of the learning model to increase an expressive power of the learning model.

10. The computer-implemented method of claim 1, wherein influence between nodes in the set of temporal graphs is dynamically determined based on updated hidden vectors of the learning model to increase an expressive power of the learning model.

11. The computer-implemented method of claim 1, further comprising performing a curative action to overcome an anomaly, responsive to one or more of the identified critical alerts.

12. The computer-implemented method of claim 1, wherein transforming the testing data comprises:
transforming the testing data into a single temporal graph;
calculating, from the single temporal graph, the other set of temporal graphs that form a graph sequence; and
transforming the graph sequence into the inference model.

13. A computer program product, the computer program product comprising a non-transitory computer readable storage medium having program instructions embodied therewith, the program instructions executable by a computer to cause the computer to perform a method comprising:
transforming, by a processor of the computer, training data into a neural network based learning model using a set of temporal graphs derived from the training data;
performing, by the processor, model learning on the learning model by automatically adjusting learning model parameters based on the set of the temporal graphs to minimize differences between a predetermined ground-truth ranking list and a learning model output ranking list;
transforming, by the processor, testing data into a neural network based inference model using another set of temporal graphs derived from the testing data; and performing, by the processor, model inference by applying the inference model and the learning model to test data to extract context features for alerts in the test data and calculate a ranking list for the alerts in the test data based on the extracted context features, wherein top-ranked ones of the alerts in the ranking list are identified as critical alerts, each of the alerts representing an anomaly in the test data.

14. The computer program product of claim 13, wherein performing the model learning comprises performing structural and temporal graph propagation over the set of temporal graphs.

15. The computer program product of claim 13, wherein the training data comprises logs, alerts, and user feedback on alerts.

16. The computer program product of claim 13, wherein transforming the training data comprises:
   transforming the training data into a single temporal graph;
   calculating, from the single temporal graph, the set of temporal graphs that form a graph sequence; and
   transforming the graph sequence into the learning model.

17. The computer program product of claim 13, wherein the learning model parameters are automatically adjusted using a back propagation through time technique.

18. The computer program product of claim 13, wherein the ground-truth ranking list is derived from user feedback on alerts.

19. The computer program product of claim 13, wherein the set of temporal graphs comprises four types of graph nodes, the four types of graph nodes being a log node type, an alert node type, a server node type, and a software node type.

20. A computer processing system, comprising:
   a processor configured to:
   transform training data into a neural network based learning model using a set of temporal graphs derived from the training data;
   perform model learning on the learning model by automatically adjusting learning model parameters based on the set of the temporal graphs to minimize differences between a predetermined ground-truth ranking list and a learning model output ranking list;
   transform testing data into a neural network based inference model using another set of temporal graphs derived from the testing data; and
   perform model inference by applying the inference model and the learning model to test data to extract context features for alerts in the test data and calculate a ranking list for the alerts in the test data based on the extracted context features, wherein top-ranked ones of the alerts in the ranking list are identified as critical alerts, each of the alerts representing an anomaly in the test data.

\* \* \* \* \*